US010632905B1

(12) United States Patent
Wolf et al.

(10) Patent No.: US 10,632,905 B1
(45) Date of Patent: Apr. 28, 2020

(54) MOVABLE PANEL ASSEMBLIES

(71) Applicants: Philipp J. Wolf, Santa Clara, CA (US); Samuel G. Fowle, San Francisco, CA (US); Donald R. Monroe, Los Gatos, CA (US); John Raff, Menlo Park, CA (US); Antonio B. Martinez, Sunnyvale, CA (US); Albert J. Golko, Saratoga, CA (US); Ali Tavakoli Targhi, Sunnyvale, CA (US); David J. Donohue, San Francisco, CA (US); David E. Kingman, Campbell, CA (US); Ibuki Kamei, Santa Clara, CA (US)

(72) Inventors: Philipp J. Wolf, Santa Clara, CA (US); Samuel G. Fowle, San Francisco, CA (US); Donald R. Monroe, Los Gatos, CA (US); John Raff, Menlo Park, CA (US); Antonio B. Martinez, Sunnyvale, CA (US); Albert J. Golko, Saratoga, CA (US); Ali Tavakoli Targhi, Sunnyvale, CA (US); David J. Donohue, San Francisco, CA (US); David E. Kingman, Campbell, CA (US); Ibuki Kamei, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 15/649,942

(22) Filed: Jul. 14, 2017

Related U.S. Application Data
(60) Provisional application No. 62/375,478, filed on Aug. 16, 2016.

(51) Int. Cl.
*B60Q 3/208* (2017.01)
*B62D 25/06* (2006.01)
(Continued)

(52) U.S. Cl.
CPC ............. *B60Q 3/208* (2017.02); *B62D 25/06* (2013.01); *G02B 6/0001* (2013.01); *B60Q 3/00* (2013.01); *B62D 25/00* (2013.01)

(58) Field of Classification Search
CPC .......... B60Q 3/208; B60Q 3/00; B62D 25/06; B62D 25/00; G02B 6/0001
See application file for complete search history.

(56) References Cited

U.S. PATENT DOCUMENTS

| 4,657,105 A | 4/1987 | Miyada |
| 4,695,090 A | 9/1987 | Draper |

(Continued)

FOREIGN PATENT DOCUMENTS

| CN | 203283013 U | 11/2013 |
| JP | 2658083 B2 | 5/1989 |

*Primary Examiner* — Mary Ellen Bowman
(74) *Attorney, Agent, or Firm* — Young Basile Hanlon & MacFarlane, P.C.

(57) ABSTRACT

A vehicle includes a movable panel assembly that is movable between a closed position and an open position, a track member that supports the movable panel assembly, and a structural member. The structural member includes a first wall portion that is connected to the track member and a second wall portion that is connected to the track member, and the track member is integrated into the structural member such that the first wall portion, the second wall portion, and the track member define part of a closed geometric cross-sectional profile of the structural member.

21 Claims, 7 Drawing Sheets

(51) Int. Cl.
*F21V 8/00* (2006.01)
*B62D 25/00* (2006.01)
*B60Q 3/00* (2017.01)

(56) References Cited

U.S. PATENT DOCUMENTS

| | | | |
|---|---|---|---|
| 4,696,509 A | | 9/1987 | Yagasaki et al. |
| 4,786,101 A | | 11/1988 | Draper |
| 4,801,174 A | * | 1/1989 | Hirshberg ................. B60J 7/047 |
| | | | 296/106 |
| 4,852,938 A | * | 8/1989 | Hirshberg .............. B60J 7/0038 |
| | | | 296/214 |
| 4,893,868 A | * | 1/1990 | Miller ...................... B60J 7/061 |
| | | | 296/219 |
| 5,001,876 A | | 3/1991 | Harper et al. |
| 5,823,609 A | | 10/1998 | Morris |
| 2004/0155489 A1 | | 8/2004 | Kawasaki |

\* cited by examiner

MOVABLE PANEL ASSEMBLIES

CROSS-REFERENCE TO RELATED APPLICATIONS

This application claims the benefit of U.S. Provisional Application No. 62/375,478, entitled "Movable Panel Assemblies," filed on Aug. 16, 2016, which is incorporated herein by reference in its entirety.

TECHNICAL FIELD

The application relates generally to movable panel assemblies for vehicle roofs.

BACKGROUND

Automobile windows function in part to admit light into the interior of a vehicle. Some automobile windows, such as windows incorporated in automobile doors, are movable to an open position to admit air into the interior of the vehicle. In order to admit additional light and air into the interior, some fixed-roof automobiles include a movable panel known as a sunroof. Sunroofs come in many styles, with the most popular styles incorporating a sliding mechanism that moves a sunroof panel rearward out of a sunroof opening, either to a compartment internal to the roof of the vehicle or to a position external to the roof of the vehicle.

SUMMARY

One aspect of the disclosed embodiments is a vehicle that includes a movable panel assembly that is movable between a closed position and an open position, a track member that supports the movable panel assembly, and a structural member, wherein the track member is integrated into the structural member.

Another aspect of the disclosed embodiments is a vehicle that includes a window and a variable translucence area defined on the window. The variable translucence area is controllable to allow a desired degree of light admission through the window. A movable panel assembly is movable between a closed position and an open position. The variable translucence area switches from a darkened state to a lightened state in response to movement of the movable panel assembly from the closed position to the open position, and the variable translucence area switches from the lightened state to the darkened state in response to movement of the movable panel assembly from the open position to the closed position.

Another aspect of the disclosed embodiments is a vehicle that includes a movable panel assembly that is movable between a closed position and an open position, a sealing structure located on the movable panel assembly at a front end of the movable panel assembly, and a window having an upper end. The sealing structure engages the upper end of the window when the movable panel assembly is in a closed position, and the sealing structure is disengaged from the upper end of the window when the movable panel assembly is in an open position.

Another aspect of the disclosed embodiments is a vehicle that includes a roof panel, an opening formed in the roof panel, and a movable panel assembly. The movable panel assembly is movable between a closed position and an open position, wherein the opening is obstructed when the movable panel assembly is in the closed position and at least part of the opening is unobstructed when the movable panel assembly is in the open position. A track carrier is located above the roof panel, and a track member disposed on the track carrier. The movable panel assembly is slidable along the track member between the closed position and the open position.

Another aspect of the disclosed embodiments is a vehicle that includes a panel that has an outer panel layer and an inner panel layer. The inner panel layer has a lateral end portion that is spaced from the outer panel layer. A material is adhered to the lateral end portion of the inner panel layer. A connecting structure is connected to the panel by the material. The vehicle also includes a track member. The panel is supported with respect to the track member by the connecting structure for movement between a closed position and an open position.

Systems and methods are also described herein.

DETAILED DESCRIPTION

The following disclosure relates to movable panel assemblies for automobiles, which may also be referred to as sunroofs.

Figure 1:
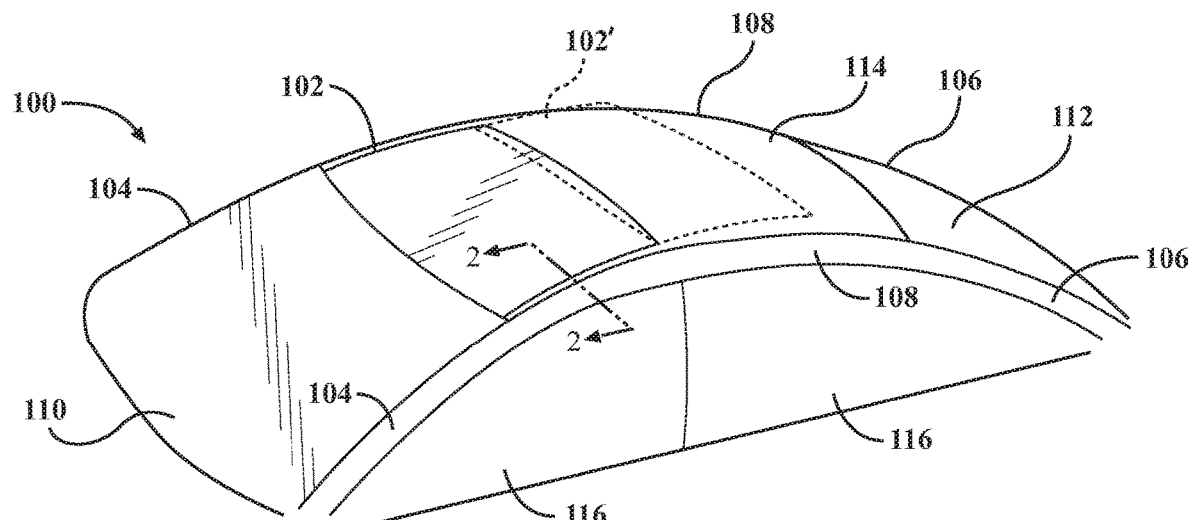
FIG. 1 is a perspective view of a portion of a first vehicle showing a movable panel assembly in a closed position and an open position.

FIG. 1 is a perspective view of a portion of a first vehicle 100 with a movable panel assembly 102 in a closed position. The movable panel assembly 102 is movable from the closed position to an open position 102' (shown in broken lines).

The portion of the first vehicle 100 that is illustrated in FIG. 1 is sometimes referred to as the greenhouse of the first vehicle 100, and may include front pillars 104, rear pillars 106, and longitudinal rails 108 (i.e., cant rails). The front pillars 104, the rear pillars 106, and the longitudinal rails 108 are structural members that define the shape of the greenhouse of the first vehicle 100, and resist forces applied to the first vehicle 100 during a collision. The front pillars 104 and the rear pillars 106 extend upward from a body portion (not shown) of the first vehicle 100, which may include one or more of a frame, a subframe, a unibody, a monocoque, and exterior body panels. The longitudinal rails 108 may be generally horizontal, and may extend from the front pillars 104 to the rear pillars 106 in order to interconnect the front pillars 104 and the rear pillars 106. In differently configured vehicles, the longitudinal rail 108 may extend from a different pair of pillars, such as from a first structural pillar of any type to a second structural pillar of any type, or the longitudinal rail 108 may be supported by a single structural pillar, such as in a cantilevered configuration.

A front window 110 (i.e., a windshield) is positioned adjacent to the front pillars 104 and extends between the front pillars 104 in a transverse direction of the first vehicle 100. A rear window 112 is positioned adjacent to the rear pillars 106 and extends between the rear pillars 106 in the transverse direction of the first vehicle 100. The movable panel assembly 102 is positioned adjacent to the longitudinal rails 108 and extends between the longitudinal rails 108 in the transverse direction of the first vehicle 100.

In some embodiments, the vehicle includes a roof panel 114 that is positioned longitudinally between the movable panel assembly 102 and the rear window 112, such that the roof panel 114 is rearward of the movable panel assembly 102 and forward of the rear window 112. In some embodiments, the roof panel 114 is an integral portion of the rear window 112. In some embodiments, the roof panel is omitted. In some embodiments, a second roof panel portion is located forward of the movable panel assembly 102, between the front window 110 and the movable panel assembly 102.

The first vehicle 100 may include one or more side windows 116. The side windows 116 may be located on lateral sides of the first vehicle 100, adjacent to one or more of the front pillars 104, the rear pillars 106, and the longitudinal rails 108. The first vehicle 100 may also include one or more intermediate pillars that extend downward from the longitudinal rails 108 and are positioned between pairs of the side windows 116.

Figure 2:
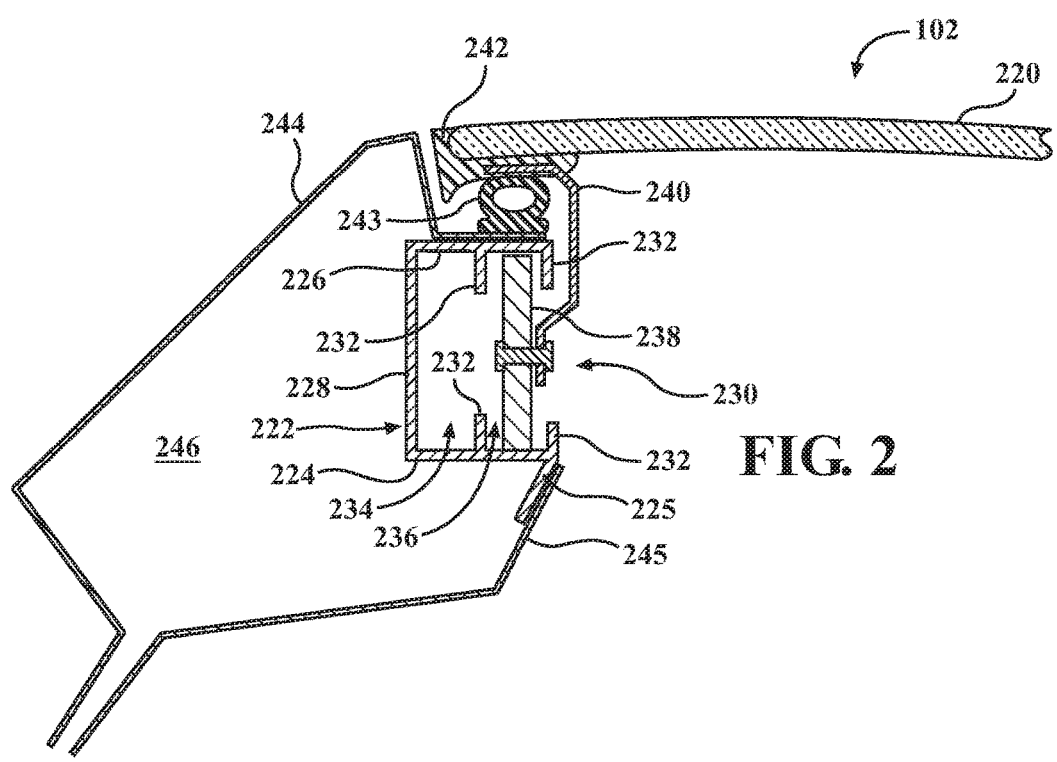
FIG. 2 is a cross-section view taken along line 2-2 of FIG. 1 showing the movable panel assembly in the closed position.

FIG. 2 is a cross-section view taken along line 2-2 of FIG. 1 showing the movable panel assembly 102 and the longitudinal rail 108. In order to maximize the width of an opening formed in the roof area of the first vehicle 100, at least part of the movable panel assembly 102 is integrated into the longitudinal rail 108 and serves as a structural component of the longitudinal rail 108, as will be explained herein.

The movable panel assembly 102 includes a panel 220 that is operable to move relative to the opening. The panel 220 obstructs the opening when the movable panel assembly 102 is in the closed position, and the panel 220 is moved such that part, most, or all of the opening is not obstructed when the movable panel assembly 102 is in the open position. The panel 220 may be generally planar or may incorporate a slight curvature that corresponds to the shape of surrounding portions of the first vehicle 100. The panel 220 may have a generally constant thickness. Suitable materials for the panel 220 include, but are not limited to, glass, metal, and plastic. In some embodiments, the panel 220 is transparent or translucent, such as when the panel 220 is formed from glass or plastic.

To permit motion of the panel 220 between the closed and open positions, the movable panel assembly 102 includes track members 222 on each lateral side of the panel 220. The track members 222 extend in the longitudinal direction of the vehicle, and are connected to and integrated in the longitudinal rails 108. The track members 222 may have a substantially constant cross-section along their lengths. As an example, the track members 222 may be extruded aluminum structures.

The track members 222 each include a bottom wall 224, a top wall 226, and a side wall 228. The side wall 228 extends in a generally vertical direction, while the bottom wall 224 and the top wall 226 each extend in a generally horizontal direction when viewed in cross-section along the line 2-2 of FIG. 1. The bottom wall 224 and the top wall 226 extend inboard (i.e., toward the lateral center of the first vehicle 100) from the side wall 228.

To allow access to an internal space of each of the track members 222, an opening 230 extends along one side of each of the track members 222. The opening 230 may be located opposite the side wall 228 on the inboard side of each of the track members 222, such that the opening 230 is disposed between the bottom wall 224 and the top wall 226. In the illustrated embodiment, projections 232 extend upward into the internal space from the bottom wall 224 and downward into the internal space from the top wall 226. The projections 232 are elongate structures that extend in the longitudinal direction, and function to divide the internal space of the track members 222 into an inner track 234 and an outer track 236. The projections 232 also function to retain and guide other structures along the inner track 234 and the outer track 236.

To support the panel 220 for sliding motion along the track members 222, the movable panel assembly 102 includes sliding members 238. The sliding members 238 are structures of any types, such as blocks, wheels, or trolleys that are connectable to the track members 222 and are able to slide longitudinally along the track members 222. As an example, the sliding members may be disposed within the outer track 236 and retained within the outer track 236 by the projections 232, which restrain lateral motion of the sliding members 238 with respect to the track members 222.

The sliding members 238 are connected to the panel 220 by connecting structures 240, such as plates, bars, rods or other structures. The connections between the connecting structures 240 and the sliding members 238 and the connections between the connecting structures 240 and the panel 220 may be fixed connections or may allow some degree of motion or compliance, such as by translation or pivoting. As an example, the connecting structures 240 may be connected to the sliding members 238 by a conventional fastener such as a pin or a bolt. As an example, the connecting structures 240 may be connected to the panel 220 by an adhesive or an encapsulating material 242, which may be a thermoplastic material.

To prevent entry of water and to reduce wind noise, the sealing member 243 may be engagable with the movable panel assembly 102. As an example, the sealing member 243 may be located on the longitudinal rail 108, and may be above the track member 222, or may be located on the track member 222. The sealing member 243 is engageable with a portion of the movable panel assembly 102 in the closed positions, such as the panel 220 or the encapsulating material 242.

Each of the track members 222 is integrated into one of the longitudinal rails 108 as a structural portion of the longitudinal rail 108. The track members 222 may be connected to the longitudinal rails 108 by fixed connections that rigidly connect the track members 222 to the longitudinal rails 108, such as by welds or bolts or screws. Integration of the track member 222 into the longitudinal rail 108 may include connection of a first wall portion 244 of the longitudinal rail 108 to the track member 222 at a first location on the track member 222, and connection of a second wall portion 245 to a second location on the track member 222. The first wall portion 244 and the second wall portion 245 may be portions of a closed geometric cross-sectional profile that is defined by the longitudinal rail 108 and the track member 222. The first and second locations on the track member 222 may be spaced from one another, and the first wall portion 244 and the second wall portion 245 may lack a direct connection to one another adjacent to the track member 222. Thus, the track member 222 serves as a structural interconnection between the first wall portion 244 and the second wall portion 245 of the longitudinal rail 108. In addition, at least a portion of the track member 222 may be exposed to an enclosed interior space 246 that is defined within the longitudinal rail 108.

In the illustrated example of FIG. 2, the first location on the track member 222 is on the top wall 226 of the track member 222, and the second location on the track member 222 is on a flange 225 that depends downward from the bottom wall 224 of the track member 222. It should be understood, however, that the track member 222 may be configured differently, and that different locations on the track member 222 may be utilized for connecting portions of the longitudinal rail 108 to the track member 222.

Figure 3:
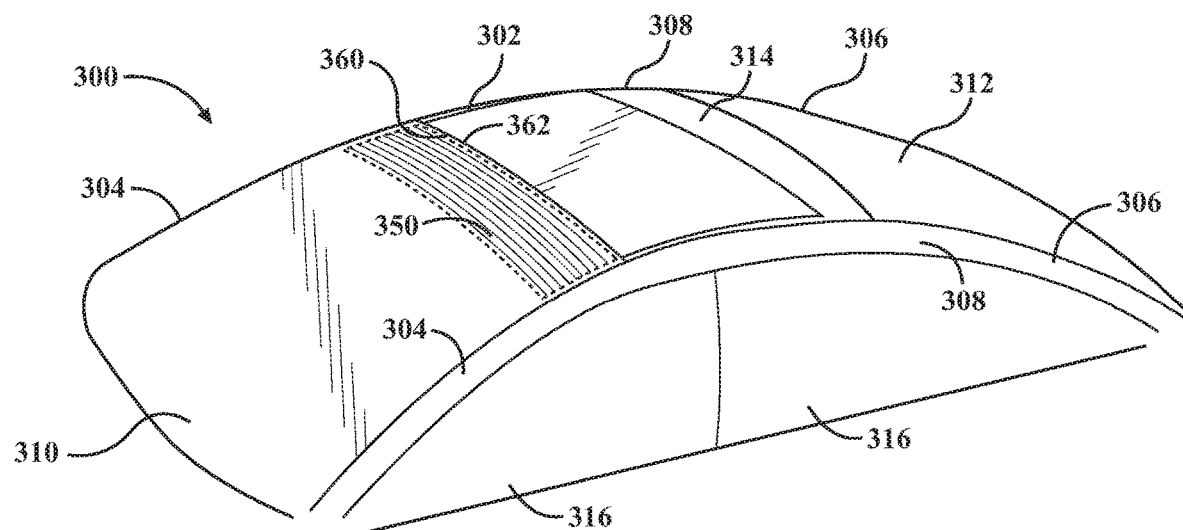
FIG. 3 is a perspective view of a portion of a second vehicle with a movable panel assembly in a closed position.

FIG. 3 is a perspective view of a portion of a second vehicle 300 with a movable panel assembly 302 in a closed position. The movable panel assembly 302 is movable from the closed position to an open position 302' (shown in broken lines).

The second vehicle 300 may include front pillars 304, rear pillars 306, and longitudinal rails 308, a front window 310, a rear window 312, a roof panel 314, and side windows 316, all of which are similar to analogous components of the first vehicle 100 of FIG. 1.

The front window 310 may be a conventional glass window. Near an upper edge 360 of the front window 310, a variable translucence area 350 is defined on the front window 310 such that the variable translucence area 350 may extend continuously across the front window 310 between the front pillars 304. The variable translucence area 350 may be defined over a limited distance from the upper edge 360 of the front window 310. As an example, the variable translucence area 350 may extend down the front window 310 from the upper edge 360 of the front window 310 by a distance that is equal to between five and twenty-five percent of the longitudinal length of the front window 310. In the closed position, the upper edge 360 of the front window 310 may be positioned adjacent to a front end 362 of the movable panel assembly 302.

In some embodiments, the variable translucence area 350 covers the entirety of the front window 310. In some embodiments, the variable translucence area 350 is also formed on other glass surfaces, such as the rear window 312, the side windows 316, and the movable panel assembly 302.

The variable translucence area 350 is operable to change an amount of light transmitted through it in response to a control signal, such as a voltage applied to the variable translucence area 350. The variable translucence area 350 may be operable to change between a first state and a second state, wherein the first state corresponds to a high level of light transmission, and the second state corresponds to a reduced level of light transmission relative to the first state. As an example, the variable translucence area 350 may be transparent or near-transparent in the first state. In the second state, transmission of light through the variable translucence area 350 is significantly reduced, such as by allowing transmission of between 90% and 0% of the light incident on the variable translucence area 350.

The variable translucence area 350 is controllable to allow a desired degree of light admission through the front window 310, and may be implemented using technologies such as one or more of liquid crystal devices, microelectromechanical devices such as microelectromechanical shutters, electrically-controlled polarizing filters, and electrochromic devices. The variable translucence area 350 may be formed on an exterior surface of the front window 310, on an interior surface of the front window 310, or within the front window 310 between layers with a laminated structure of the front window 310.

Figure 4:
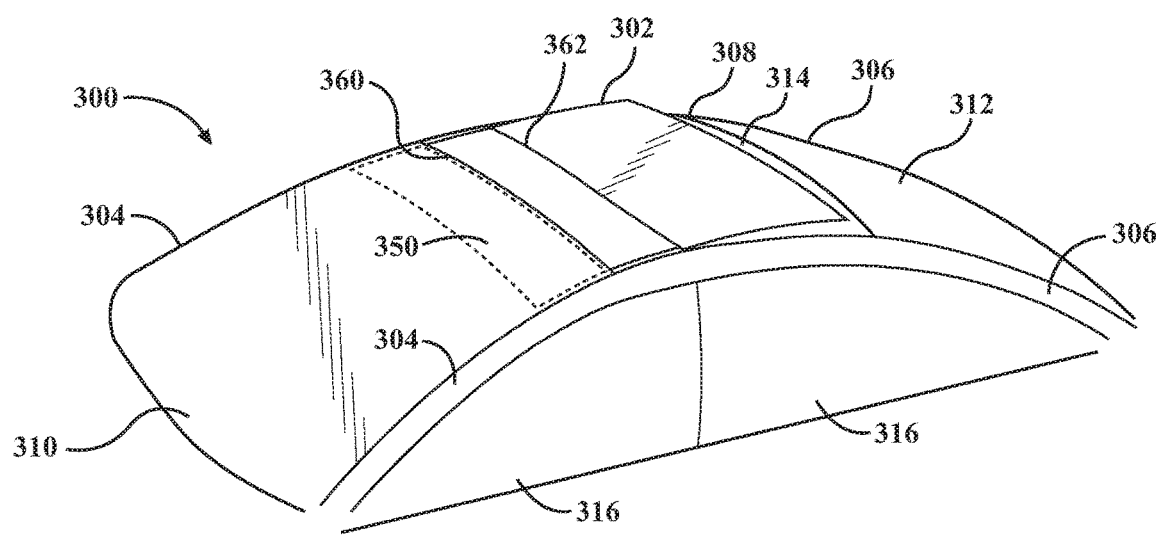
FIG. 4 is a perspective view of a portion of the second vehicle with the movable panel assembly in an open position.

The variable translucence area 350 is controlled such that its translucence changes in response to movement of the movable panel assembly 302. When the movable panel assembly 302 is in the closed position, the variable translucence area 350 may be in a darkened state, such as the second state as described above. The darkened state of the variable translucence area 350 may be utilized by occupants of the vehicle to, for example, reduce glare caused by sunlight at certain times of the day, such as at sunrise or sunset. The variable translucence area 350 is controlled to change from the darkened state to the lightened state when the movable panel assembly 302 is in the open position, as shown in FIG. 4, which is a perspective view of a portion of the second vehicle 300 showing the movable panel assembly 302 in the open position. In the lightened state, which may correspond to the first state described above, the variable translucence area admits more light than in the darkened state, and may be translucent or near-translucent. Thus, the variable translucence area 350 may increase a degree of light admission by changing states in response to movement of the movable panel assembly 302 from the closed position to the open position, and the variable translucence area 350 may decrease a degree of light admission by changing states in response to movement of the movable panel assembly 302 from the open position to the closed position. The degrees of light admission may be, as examples, a first degree of light admission that is greater than a second degree of light admission.

Figure 5:
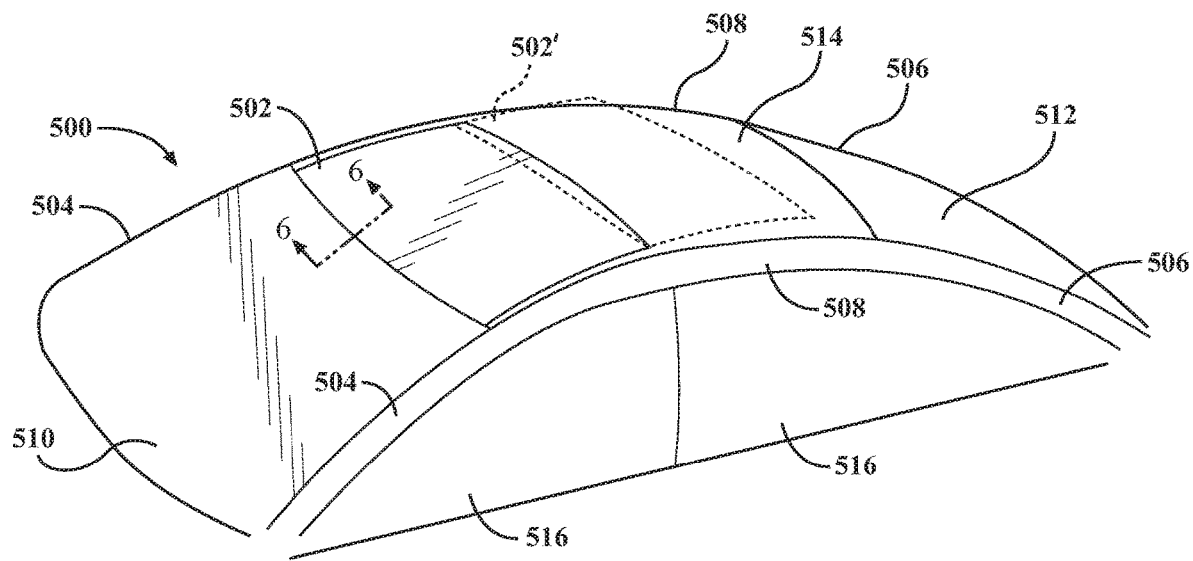
FIG. 5 is a perspective view of a portion of a third vehicle with a movable panel assembly in a closed position.

FIG. 5 is a perspective view of a portion of a third vehicle 500 with a movable panel assembly 502 in a closed position, in which the panel 620 obstructs an opening formed in the roof area of the third vehicle 500. The movable panel assembly 502 is movable from the closed position to an open position 502' (shown in broken lines), in which at least part of the opening is not obstructed by the movable panel assembly 502.

The third vehicle 500 may include front pillars 504, rear pillars 506, longitudinal rails 508, a front window 510, a rear window 512, a roof panel 514, and side windows 516, all of which are similar to analogous components of the first vehicle 100 of FIG. 1.

An upper end 560 of the front window 510 is in contact with and adjacent to a front end 562 of the movable panel assembly 502 in the closed position. The front window 510 may be formed from a translucent (i.e., partially or fully transparent) material such as glass or plastic. In some embodiments, the front window 510 is free from non-translucent glass portions or structures at or near the upper end 560 of the front window 510. In some embodiments, the front window 510 is free from non-glass structures at and/or near the upper end 560. This allows for additional light admission into the interior of the vehicle, and provides visual continuity between the front window 510 and the opening that is defined when the movable panel assembly 502 is open.

Figure 6:
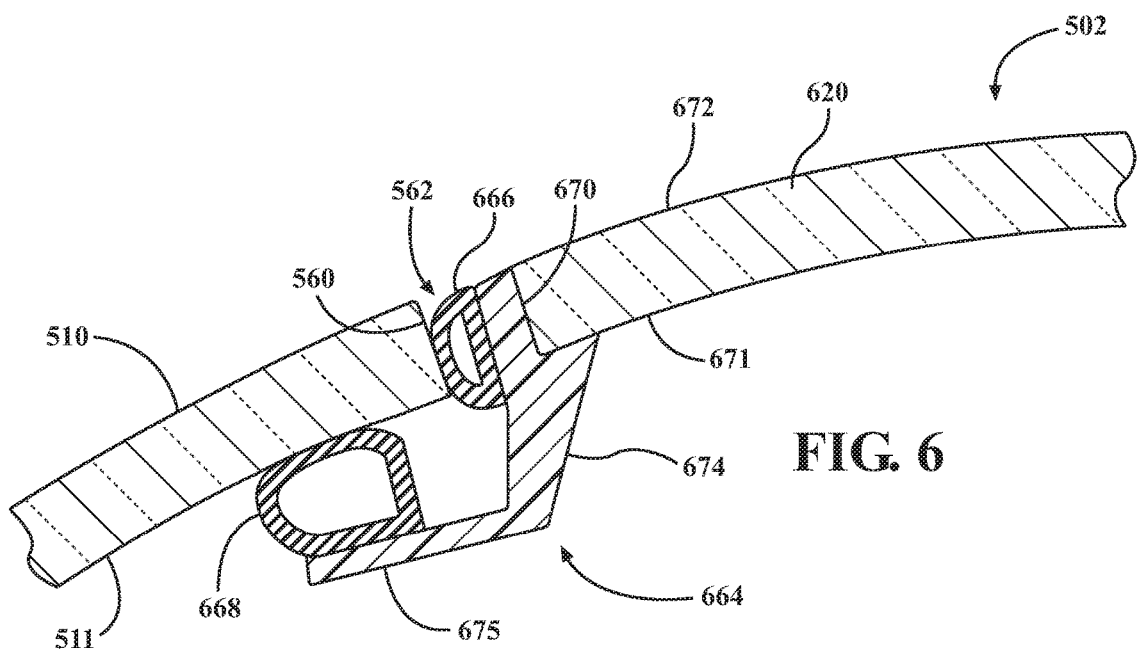
FIG. 6 is a cross-section view taken along line 6-6 of FIG. 5 showing the movable panel assembly in the closed position.

FIG. 6 is a cross-section view taken along line 6-6 of FIG. 5 showing the movable panel assembly 502 in the closed position. As shown in FIG. 6, the movable panel assembly 502 includes a sealing structure that is located at the front end 562 of the movable panel assembly 502. The sealing structure includes one or more seals that are engagable with the front window 510. In the illustrated example, the sealing structure includes a seal carrier 664, a first sealing member 666, and a second sealing member 668. The first sealing member 666 and the second sealing member 668 engage the upper end 560 of the front window 510 when the movable panel assembly 502 is in the closed position in order to prevent entry of water into the third vehicle 500 and to reduce wind noise.

The seal carrier 664 is an elongate structure that extends in the transverse direction of the third vehicle 500 along the front end 562 of the movable panel assembly 502. Thus, the sealing structure, including the seal carrier 664, the first sealing member 666, and the second sealing member 668, may be interposed between the movable panel assembly 502 and the front window 510 continuously along the upper end 560 of the front window 510 and the front end 562 of the movable panel assembly 502. The seal carrier 664 may be formed from, as examples, plastic or metal. In some embodiments, the seal carrier 664 is made from translucent plastic. In some embodiments, the seal carrier 664 may be formed from an encapsulation material, such as a thermoplastic.

The seal carrier 664 is attached to a panel 620 of the movable panel assembly 502. The panel 620 is made of a translucent material, such as glass or plastic, and may be translucent up to a leading edge 670 of the panel 620. The seal carrier 664 is connected to one or both of the leading edge 670 of the panel 620 and an interior surface 671 of the panel 620. The interior surface 671 of the panel 620 faces the interior of the third vehicle 500, and is opposite an exterior surface 672 of the panel 620, which faces outward and is visible from outside of the third vehicle 500. In some embodiments, the seal carrier 664 is configured such that no portion of the seal carrier 664 extends above the exterior surface 672 of the seal carrier 664.

The seal carrier 664 includes a first portion 674 and a second portion 675. The first portion 674 of the seal carrier 664 is connected to the leading edge 670 of the panel 620 and/or to the interior surface 671 of the panel 620 adjacent to the leading edge 670. The first portion 674 of the seal carrier 664 depends downward from the panel 620. The second portion 675 of the seal carrier 664 extends outward or forward from the first portion 674 of the seal carrier 664, and is located partially under the front window 510.

The first sealing member 666 is formed on the first portion 674 of the seal carrier 664 and extends forward from the first portion 674 of the seal carrier 664. When the movable panel assembly 502 is in the closed position, the first sealing member 666 is positioned between the panel 620 and the front window 510 and is in engagement with the front window 510. The second sealing member 668 is formed on the second portion 675 of the seal carrier 664 and extends upward from the second portion 675 of the seal carrier 664. When the movable panel assembly 502 is in the closed position, the second sealing member 668 is positioned under the front window, and is in engagement with an interior surface 511 of the front window 510.

The first sealing member 666 and the second sealing member 668 are formed from flexible material, such as conventional weatherstripping materials or gasket materials. As examples, the first sealing member 666 and the second sealing member 668 may be formed from EPDM rubber, thermoplastic elastomer (TPE), thermoplastic olefin (TPO), silicone, or other suitable materials.

Figure 7:
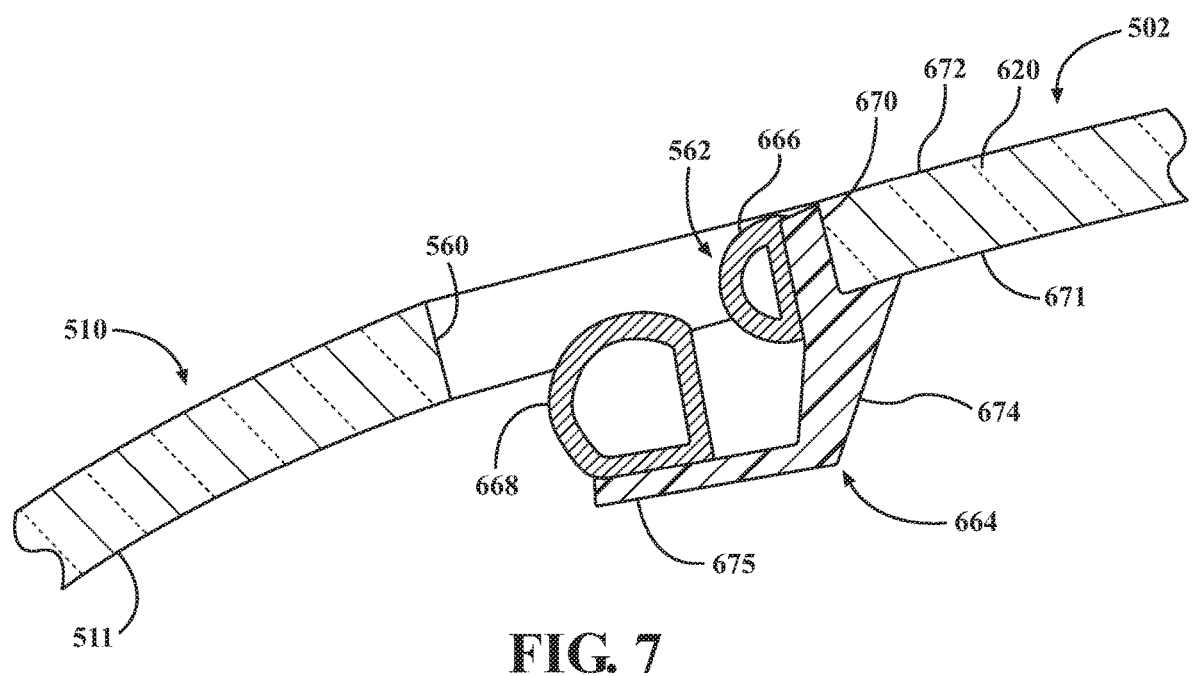
FIG. 7 is a cross-section view taken along line 6-6 of FIG. 5 showing the movable panel assembly in an open position.

FIG. 7 is a cross-section view taken along line 6-6 of FIG. 5 showing the movable panel assembly 502 in the open position. In the open position, the movable panel assembly 502 has moved away from the front window 510, such as by translating rearward. During movement from the closed position to the open position, the sealing structure, including the first sealing member 666 and the second sealing member 668, disengages from the upper end 560 of the front window 510, while moving in unison with the seal carrier 664 and the panel 620. Thus, the sealing structure is disengaged from and spaced from the upper end 560 of the front window 510 when the movable panel assembly is in the open position.

Figure 8:
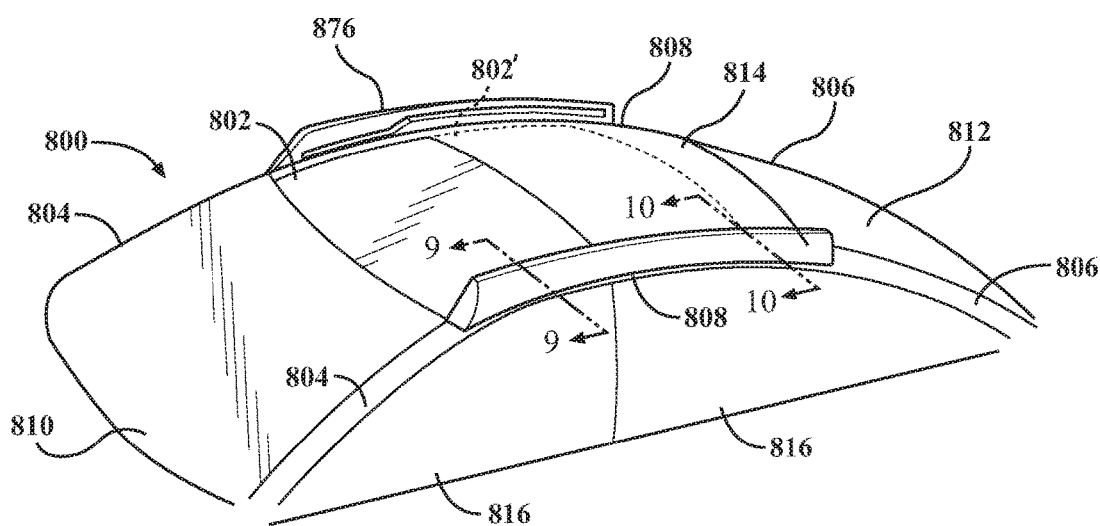
FIG. 8 is a perspective view of a portion of a fourth vehicle with a movable panel assembly in a closed position.

FIG. 8 is a perspective view of a portion of a fourth vehicle 800 with a movable panel assembly 802 in a closed position, in which the movable panel assembly 802 obstructs an opening formed in the roof area of the fourth vehicle 800. The movable panel assembly 802 is movable from the closed position to an open position 802' (shown in broken lines), in which at least part of the opening is not obstructed by the movable panel assembly 802.

The fourth vehicle 800 may include front pillars 804, rear pillars 806, longitudinal rails 808, a windshield 810, a rear window 812, a roof panel 814, and side windows 816, all of which are similar to analogous components of the first vehicle 100 of FIG. 1.

The fourth vehicle includes track carriers 876 that are disposed on the exterior of the fourth vehicle 800 and are positioned above other portions of the fourth vehicle 800, including the longitudinal rails 808 and the roof panel 814. As will be described herein, the track carriers 876 support the movable panel assembly 802 in a manner that allows the movable panel assembly 802 to move between the closed position and the open position 802'. When the movable panel assembly 802 is in the closed position, the track carriers 876 may be disposed entirely above any or all of the movable panel assembly 802, the longitudinal rails 808, and the roof panel 814. Thus, the track carriers 876 are externally positioned on the fourth vehicle 800 and may extend upward from an exterior surface of the fourth vehicle 800.

The track carriers 876 are elongate structures that extend in the longitudinal direction of the fourth vehicle 800. The track carriers 876 may be positioned on top of the longitudinal rails 808 and extend along the longitudinal rails 808.

Figure 9:
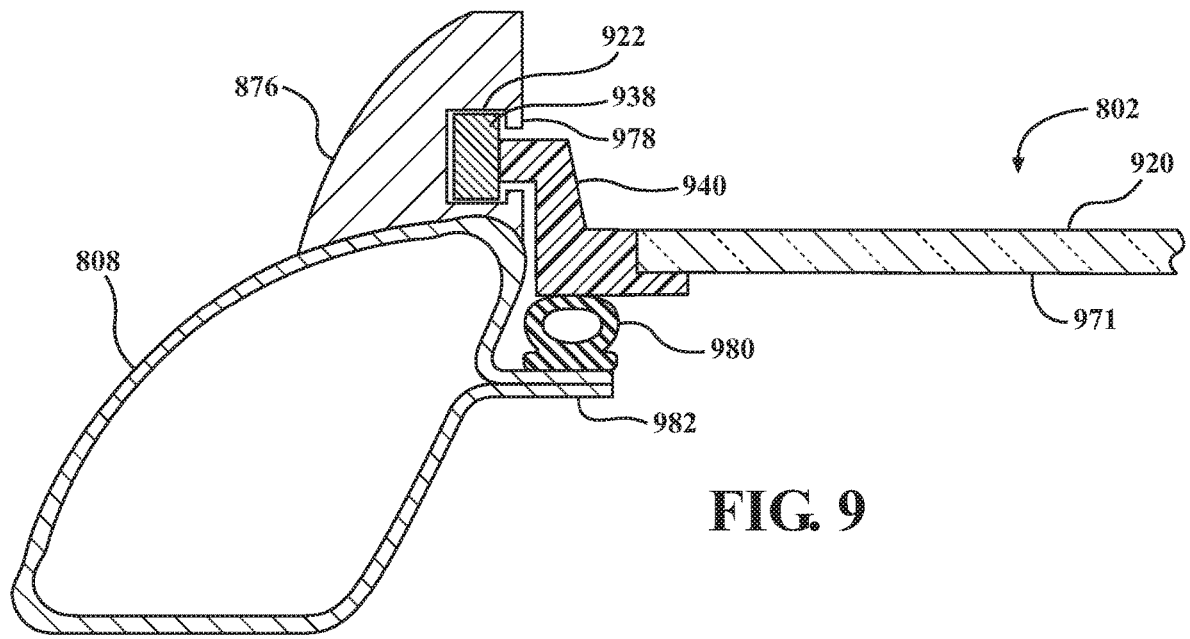
FIG. 9 is a cross-section view taken along line 9-9 of FIG. 8 showing the movable panel assembly in the closed position.

As shown in FIG. 9, which is a cross-section view taken along line 9-9 of FIG. 8 with the movable panel assembly 802 in the closed position, the track carriers 876 may extend upward from the longitudinal rails 808. The track carriers 876 each have an inner surface 978 that extends generally upward from the longitudinal rail 808 and faces in the inboard direction of the fourth vehicle 800, such that the inner surface 978 is oriented toward a panel 820 of the movable panel assembly 802. The track members 822 are recessed into the inner surfaces 978 of each of the track carriers 876 and extend in the longitudinal direction of the fourth vehicle 800 along the track carriers 876.

In order to support the movable panel assembly 802 with respect to the track members 822, the movable panel assembly 802 includes sliding members 938. The sliding members 938 are disposed in the track members 922 such that the track members 922 guide motion of the sliding members 938 as the sliding members 938 move in the longitudinal direction of the fourth vehicle 800 along the track members 922. The sliding members 938 are connected to the panel 920 by connecting structures 940.

When the movable panel assembly 802 is in the closed position, an interior surface 971 of the panel 920 may be in engagement with sealing members 980 at the lateral sides of the panel 920. The sealing members 980 are formed from a flexible material such as a weatherstripping material or a gasket material. The sealing members 980 function to prevent water from entering the interior of the fourth vehicle 800 and reduce wind noise. The sealing members 980 may be disposed on support structures 982 that extend inward from the longitudinal rails 808.

Figure 10:
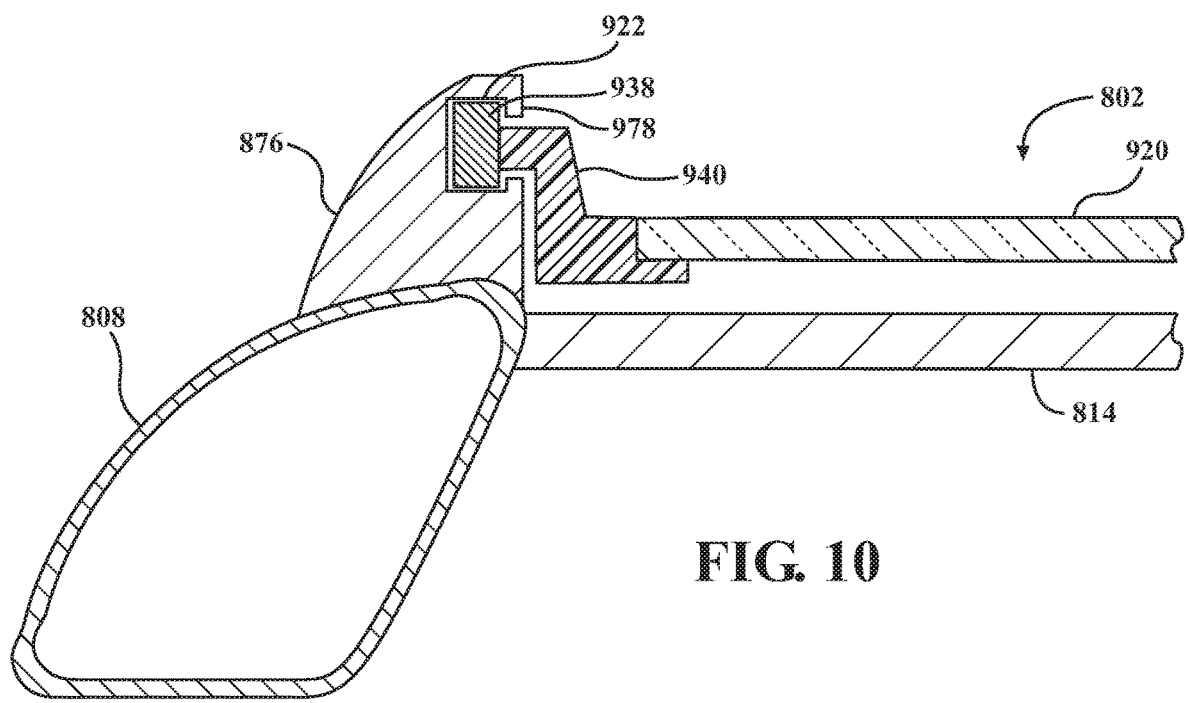
FIG. 10 is a cross-section view taken along line 10-10 of FIG. 8 showing the movable panel assembly in an open position.

FIG. 10 is a cross-section view taken along line 10-10 of FIG. 8 showing the movable panel assembly 802 in the open position. The track member 922 is configured such that its elevation rises from front to rear. As the movable panel assembly 802 moves rearward, the rise in elevation of the track members 922 causes the movable panel assembly 802 to rise in correspondence to the elevation of the track member 922. In the open position, the movable panel assembly 802 is moved so at least part of the opening is not obstructed by the panel 920. In the illustrated example in FIG. 10, the movable panel assembly 802 has moved rearward and upward along the track members 922, such that at least a portion of the panel 920 is positioned above the roof panel 814 and/or the rear window 812.

Figure 11:
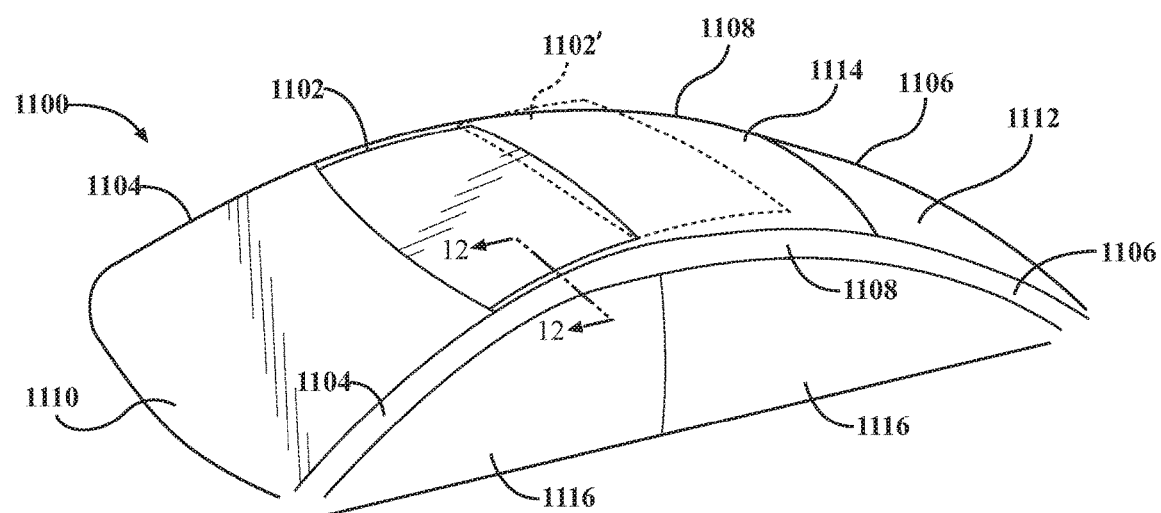
FIG. 11 is a perspective view of a portion of a fifth vehicle with a movable panel assembly in a closed position.

FIG. 11 is a perspective view of a portion of a fifth vehicle 1100 with a movable panel assembly 1102 in a closed position in which the movable panel assembly obstructs an opening that is formed in a roof area of the fifth vehicle 1100. The movable panel assembly 1102 is movable from the closed position to an open position 1102' (shown in broken lines), in which at least part of the opening is not obstructed by the movable panel assembly 502.

The fifth vehicle 1100 may include front pillars 1104, rear pillars 1106, longitudinal rails 1108, a windshield 1110, a rear window 1112, a roof panel 1114, and side windows 1116, all of which are similar to analogous components of the first vehicle 100 of FIG. 1.

Figure 12:
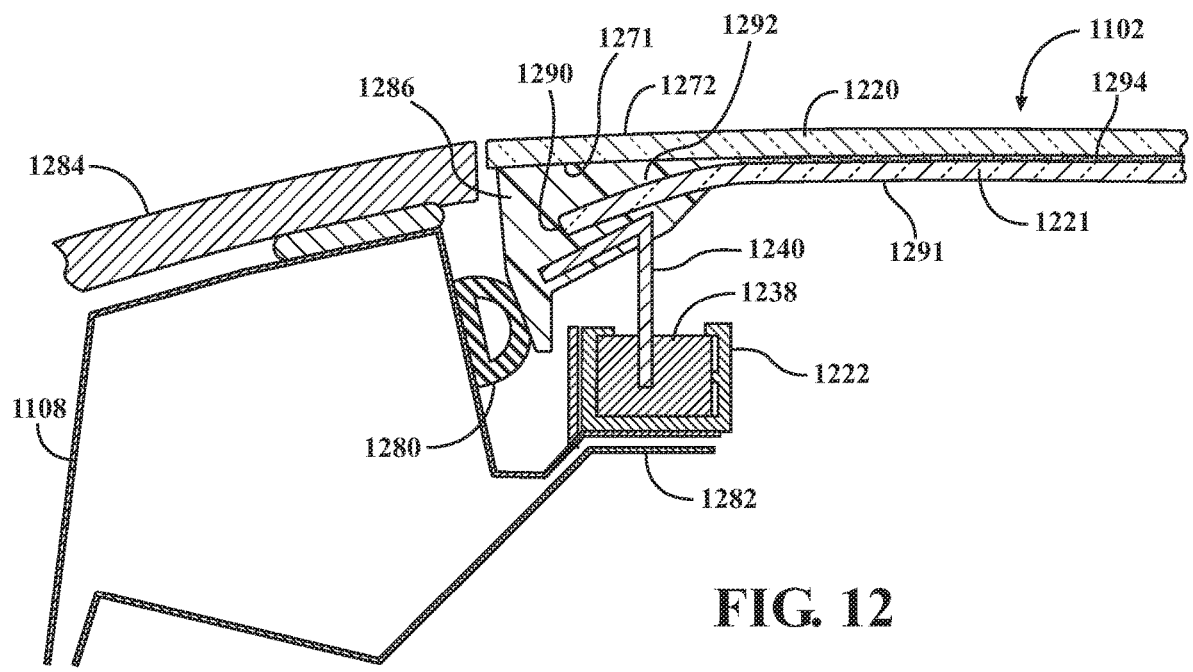
FIG. 12 is a cross-section view taken along line 12-12 of FIG. 11 showing the movable panel assembly in the closed position.

FIG. 12 is a cross-section view taken along line 12-12 of FIG. 11 showing the movable panel assembly in the closed position. In order to support the movable panel assembly 1102, support structures 1282 extend inboard from the longitudinal rails 1108, and track members 1222 are disposed on the support structures 1282, as shown in FIG. 12. The track members 1222 and the support structures 1282 extend in the longitudinal direction of the fifth vehicle 1100. Sliding members 1238 are disposed in track members 1222 and are movable forward and rearward along the track members 1222.

The movable panel assembly 1102 includes a panel that is defined by an outer panel layer 1220 and an inner panel layer 1221. The outer panel layer 1220 is exposed to the exterior of the fifth vehicle 1100, and the inner panel layer 1221 may be exposed to the interior of the fifth vehicle 1100. The outer panel layer 1220 and the inner panel layer 1221 are formed from a translucent material, in order to allow light to be admitted into the interior of the fifth vehicle 1100 when the movable panel assembly 1102 is in the closed position. As examples, the outer panel layer 1220 and the inner panel layer 1221 may be formed from translucent glass or from translucent plastic. The outer panel layer 1220 may be fixed to the inner panel layer 1221, such as by fasteners or adhesives. As an example, a clear adhesive may be used to fix the outer panel layer 1220 to the inner panel layer 1221. As another example, the outer panel layer 1220 may be connected to the inner panel layer 1221 by an interlayer 1294. The interlayer 1294 may be formed from a transparent material that adheres to the outer panel layer 1220 and the inner panel layer 1221, such as Polyvinyl butyral (PVB). In some embodiments, several interlayers are included between the outer panel layer 1220 and the inner panel layer 1221. For example, a technology interlayer that includes antennas, heating elements, or other components, may be placed between two adhesive interlayers formed from PVB or other suitable materials.

An exterior surface 1272 of the outer panel layer 1220 may be aligned with the exterior surfaces of exterior panels 1284 that are located on the exterior of the longitudinal rails 1108 and are positioned adjacent to the outer panel layer 1220 on the lateral sides of the movable panel assembly 1102. As an example, the exterior panels 1284 may be formed from glass or plastic, may be translucent, and may be formed from the same material as the outer panel layer 1220. The exterior panels 1284 may be connected to the longitudinal rails 1108, such as by fasteners or adhesives.

To connect the outer panel layer 1220 and the inner panel layer 1221 to the sliding members 1238, an encapsulation material 1286, such as thermoplastic, is disposed on the lateral edges of the outer panel layer 1220 and the inner panel layer 1221. The connecting structures 1240 are embedded in the encapsulation material 1286 and are connected to the sliding members 1238 to support the outer panel layer 1220 and the inner panel layer 1221 for sliding movement between the closed and open positions.

To bond the encapsulation material 1286 securely to the outer panel layer 1220 and the inner panel layer 1221, the inner panel layer 1221 includes lateral end portions that are spaced from the outer panel layer 1220. Thus, the inner panel layer 1221 and the outer panel layer 1220 may be at a close, consistent spacing near a central portion of the outer panel layer 1220 and the inner panel layer 1221, but the inner panel layer 1221 deviates downward from the outer panel layer 1220 near the lateral edges of the outer panel layer 1220 and the inner panel layer 1221. The encapsulation material 1286 surrounds the lateral end portions of the inner panel layer 1221. Accordingly, the encapsulation material 1286 may be in contact with and adhered to an interior surface 1271 of the outer panel layer 1220, and the lateral end portions of the inner panel layer, such that a lateral end surface 1290 of the inner panel layer 1221, the interior surface 1291 of the inner panel layer 1221, and an exterior surface 1292 of the inner panel layer 1221 are in contact with the encapsulation material 1286. The encapsulation material 1286 may terminate on the interior surface 1271 of the outer panel layer 1220, such that an outer edge and the exterior surface 1272 of the outer panel layer 1220 are free from the encapsulation material. This allows a smooth visual transition between the outer panel layer 1220 and the exterior panels 1284, such as by allowing the two structures to meet at adjacent glass edges with no structures disposed between them.

To prevent water from entering the fifth vehicle 1100 and to reduce wind noise, sealing members 1280 may be in engagement with the movable panel assembly 1102 when the movable panel assembly 1102 is in the closed position. As an example, the sealing members 1280 may be located on the longitudinal rails 1108 and may be engageable with a lateral side surface of the encapsulation material 1286.

Figure 13:
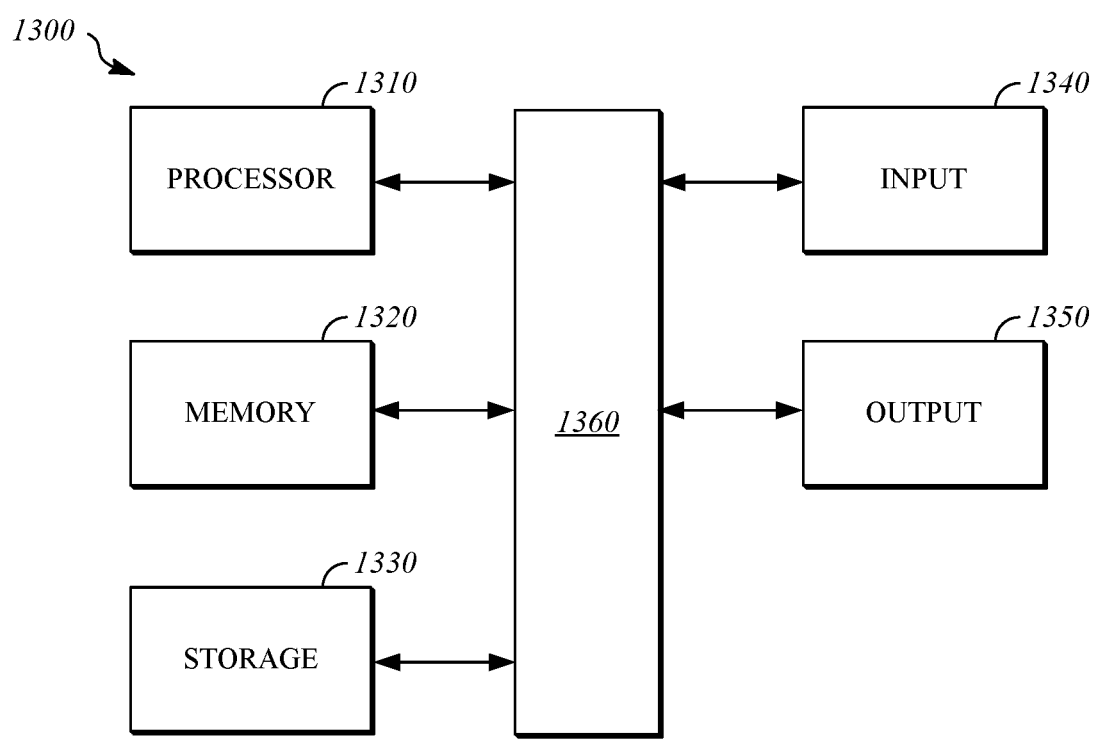
FIG. 13 shows an exemplary hardware configuration for a controller.

FIG. 13 shows an exemplary hardware configuration for a controller 1300 that may be used to implement the apparatuses and systems described herein. As an example, the controller 1300 may output a command, such as a voltage value, to the variable translucence area 350 of FIG. 3 in response to movement of the movable panel assembly 302 between closed and open positions.

The controller 1300 may include a processor 1310, a memory 1320, a storage device 1330, one or more input devices 1340, and one or more output devices 1350. The controller 1300 may include a bus 1360 or a similar device to interconnect the components for communication. The processor 1310 is operable to execute computer program instructions and perform operations described by the computer program instructions. As an example, the processor 1310 may be a conventional device such as a central processing unit. The memory 1320 may be a volatile, high-speed, short-term information storage device such as a random-access memory module. The storage device 1330 may be a non-volatile information storage device such as a hard drive or a solid-state drive. The input devices 1340 may include any type of human-machine interface such as buttons, switches, a keyboard, a mouse, a touchscreen input device, a gestural input device, or an audio input device. The output devices 1350 may include any type of device operable to provide an indication to a user regarding an operating state, such as a display screen or an audio output.

What is claimed is:

1. A vehicle, comprising:
    a movable panel assembly that is movable between a closed position and an open position;
    a track member that supports the movable panel assembly; and
    a structural member, wherein the structural member includes a first wall portion that is connected to the track member and a second wall portion that is connected to the track member, and the track member is integrated into the structural member such that the first wall portion, the second wall portion, and the track member define part of a closed geometric cross-sectional profile of the structural member, wherein the first wall portion and the second wall portion lack a direct connection to one another adjacent to the track member such that the track member serves as a structural interconnection between the first wall portion and the second wall portion.

2. The vehicle of claim 1, wherein the first wall portion is connected to a first location on the track member, the second wall portion is connected to a second location on the track member, and the first location on the track member is spaced from the second location on the track member.

3. The vehicle of claim 1, wherein the structural member is a cant rail.

4. The vehicle of claim 3, wherein the structural member extends from a first structural pillar to a second structural pillar.

5. The vehicle of claim 1, wherein the movable panel assembly includes a sliding member that is disposed in the track member and slides along the track member as the movable panel assembly moves between the closed position and the open position.

6. The vehicle of claim 1, wherein:
    the movable panel assembly includes a panel, a sliding member that is disposed in the track member and slides along the track member as the movable panel assembly moves between the closed position and the open position, and a connecting structure that connects the sliding member to the panel,
    the panel obstructs an opening in a roof area when the movable panel assembly is in a closed position, and
    at least part of the opening is unobstructed when the movable panel assembly is in an open position.

7. A vehicle, comprising:
    a window;
    a variable translucence area defined on the window, wherein the variable translucence area is controllable to allow a desired degree of light admission through the window; and
    a movable panel assembly that is movable between a closed position and an open position, wherein the variable translucence area switches from a darkened state to a lightened state in response to movement of the movable panel assembly from the closed position to the open position, and the variable translucence area switches from the lightened state to the darkened state in response to movement of the movable panel assembly from the open position to the closed position.

8. The vehicle of claim 7, wherein the window is a front window, the variable translucence area is located at an upper edge of the window, and the upper edge of the window is adjacent to a front end of the movable panel assembly in the closed position.

9. The vehicle of claim 7, wherein the variable translucence area includes at least one of a liquid crystal device, a microelectromechanical device, an electrically controlled polarizing filter, or an electrochromic device.

10. A vehicle, comprising:
    a movable panel assembly that is movable between a closed position and an open position;
    a sealing structure that includes a seal carrier that is located on the movable panel assembly at a front end of the movable panel assembly and includes a seal that is located on the seal carrier; and
    a translucent front window having an upper end, wherein the seal of the sealing structure engages the upper end of the translucent front window when the movable panel assembly is in a closed position, and the sealing structure is disengaged from the upper end of the window when the movable panel assembly is in an open position.

11. The vehicle of claim 10, wherein the sealing structure includes a seal carrier that is formed from a translucent material.

12. The vehicle of claim 10, wherein the seal is a first seal that is engagable with the upper end of the window and a second seal is located on the seal carrier and is engagable with an interior surface of the window.

13. The vehicle of claim 12, wherein the seal carrier includes a first portion that depends downward from the front end of the movable panel assembly, a second portion that extends outward from the first portion of the seal carrier, the first seal is disposed on the first portion of the seal carrier, and the second seal is disposed on the second portion of the seal carrier.

14. A vehicle, comprising:
    a roof panel;
    an opening formed in the roof panel;
    a movable panel assembly that is movable between a closed position and an open position, wherein the opening is obstructed when the movable panel assembly is in the closed position and at least part of the opening is unobstructed when the movable panel assembly is in the open position;

a track carrier that is located on an exterior surface of the roof panel and extends upward from the exterior surface of the roof panel such that the track carrier is disposed above the roof panel; and a track member disposed on the track carrier, wherein the movable panel assembly is slidable along the track member between the closed position and the open position.

15. The vehicle of claim 14, wherein the track carrier has an inboard-facing surface and the track member is recessed into the inboard-facing surface of the track carrier.

16. The vehicle of claim 14, wherein the movable panel assembly has a panel, a sliding member that is disposed in the track member for sliding along the track member, and a connecting structure for connecting the panel to the sliding member.

17. A vehicle, comprising:

a panel having an outer panel layer and an inner panel layer that is fixed to the outer panel layer by an adhesive, the inner panel layer having a lateral end portion that is spaced from the outer panel layer;

an encapsulation material that is adhered to the lateral end portion of the inner panel layer;

a connecting structure that is embedded in the encapsulation material so that the connecting structure is connected to the panel by the encapsulation material; and a track member, wherein the panel is supported with respect to the track member by the connecting structure for movement between a closed position and an open position.

18. The vehicle of claim 17, wherein at least a portion of the inner panel layer is in direct engagement with at least a portion of the outer panel layer.

19. The vehicle of claim 17, wherein at least part of the encapsulation material is disposed between the outer panel layer and the lateral end portion of the inner panel layer.

20. The vehicle of claim 17, wherein the encapsulation material encapsulates the lateral end portion of the inner panel layer.

21. The vehicle of claim 1, wherein the track member is an extruded aluminum structure.

* * * * *